April 22, 1958
E. A. KELSO
2,831,800
METHOD FOR CONDUCTING CATALYTIC REACTION
USING A FLUIDIZED SOLID CATALYST
Filed Jan. 29, 1954
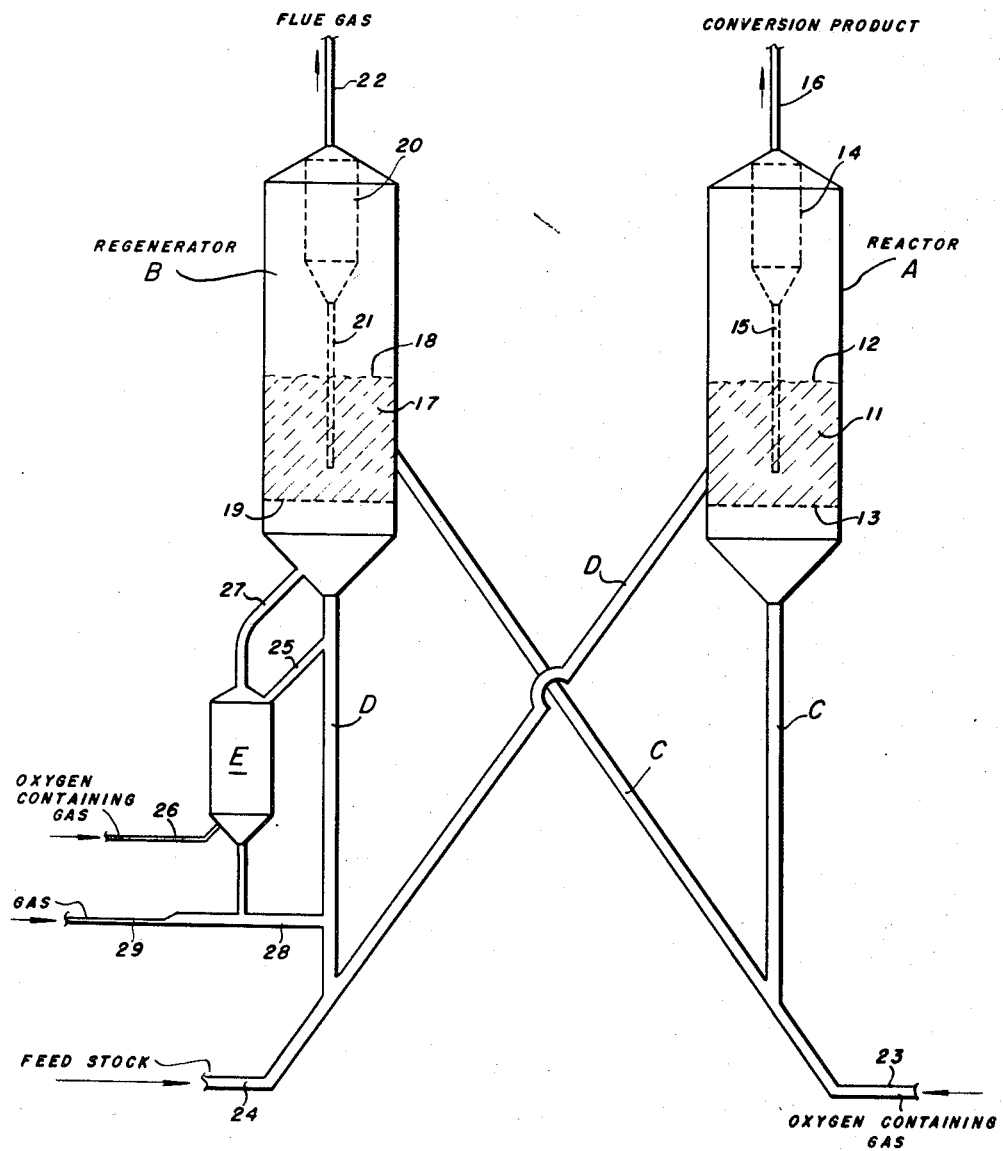
INVENTOR.
Edward A. Kelso,
BY
ATTORNEY.

United States Patent Office 2,831,800
Patented Apr. 22, 1958

2,831,800

METHOD FOR CONDUCTING CATALYTIC REACTION USING A FLUIDIZED SOLID CATALYST

Edward A. Kelso, Baytown, Tex., assignor, by mesne assignments, to Esso Research and Engineering Company, Elizabeth, N. J., a corporation of Delaware Application January 29, 1954, Serial No. 407,018

11 Claims. (Cl. 196—52)

The present invention is directed to an improved method for conducting a catalytic reaction in which a fluidized solid type of catalyst is employed.

It is known to the art to employ a fluidized solid type of catalyst for conducting reactions with organic compounds. Such catalysts have been found particularly useful in the catalytic cracking of petroleum fractions. As examples of cracking catalysts may be mentioned silica, alumina, zirconia or mixtures of these oxides. In these reactions it is customary to maintain the fluidized catalyst circulating in the system including a reaction zone and a regeneration zone with a fluidized stream of spent catalyst continuously passing from the reaction zone to the regeneration zone and a fluidized stream of regenerated catalyst continuously returned in a stream from the regeneration zone to the reaction zone. In one modification of such a procedure the reaction zones and regeneration zones are maintained as dense phase beds. For a description of such a system see U. S. Patent 2,407,374, issued in the name of Conrad H. Kollenberg on September 10, 1946.

As another modification of such a system the reaction zone is operated with the catalyst maintained as a disperse phase while the regeneration zone has the catalyst maintained as a dense phase bed. As another embodiment the catalyst in the reaction zone is maintained in a disperse phase and the catalyst in the regeneration zone is maintained in a disperse phase. For a description of such embodiments see U. S. patent application Serial No. 355,022, filed in the name of Jack M. Andrews et al. on May 14, 1953. The improvement to which the present application is directed is applicable to any of the conventional systems where fluidized catalyst is maintained in a reactor and a regenerator and spent catalyst is continuously passed from the reactor to the regenerator and regenerated catalyst is continuously passed from the regenerator to the reactor.

In said conventional systems for employing a fluidized catalyst for reacting organic materials, the catalyst in the reaction zone accumulates carbon which causes deterioration of the catalyst activity and selectivity with a resultant degradation in product distribution and it is for this reason that catalyst is taken from the reaction zone to the regeneration zone where carbon is burned from the catalyst. In the conventional procedure under equilibrium conditions, although substantially all of the carbon deposited on the catalyst in its immediate prior cycle through the reactor is burned from the catalyst in the regeneration zone to regenerate it and prevent a buildup of carbon, an appreciable amount of carbon remains on the regenerated catalyst and is not removed throughout the cycle. This residual carbon is hereafter designated as "old" carbon to distinguish it from the carbon deposited on the catalyst at its immediate prior reaction cycle. This old carbon may be in an amount within the range of 0.3 to 1 weight percent based on the total amount of catalyst. This old carbon which is not burned off the catalyst as it circulates through the system, remains on the catalyst and stays in the system until the catalyst particle on which the old carbon is deposited is either lost or withdrawn from the system. Thus, the average age of the old carbon on the catalyst particles may be within the range of 20 to 60 days in commercial units depending on the rate at which catalyst is lost and withdrawn from the system and is replaced by fresh catalyst.

It has now been discovered that this residual carbon or old carbon on the regenerated catalyst lowers substantially the activity or value of the catalyst for converting hydrocarbons, and that the loss in activity resulting from this old carbon deposit is proportional to the age of the old carbon. The conversion of the hydrocarbons in the reaction zone, which is a direct measure of the catalyst activity is substantially less as the age of the old carbon on the catalyst increases and the carbon burning rate constant is less as the age of the old carbon increases.

It is not practical commercially to reduce the carbon content of the entire body of regenerated catalyst to substantially zero because of the greatly increased amounts of combustion air and the increased discard of unused oxygen in the flue gas which would be required. It may be noted that for reasons of economy the regeneration process is conducted by using air as the combustion gas and the operation is conducted in most conventional units so that the oxygen content of the flue gases leaving the regeneration unit approaches zero.

In accordance with the present invention, a procedure is carried out using a circulating stream of fluidized solid catalyst with a body of catalyst forming a reaction zone, a body of catalyst forming a regeneration zone and a continuous stream of spent catalyst passed from the reaction zone to the regeneration zone and a continuous stream of regenerated catalyst sent from the regeneration zone to the reaction zone. The regeneration procedure may be carried out so that the exit flue gases have substantially zero oxygen content and small portions of catalyst are removed from said circulating stream to a second regenerator where the carbon on said catalyst is reduced to an amount no greater than 0.1% that is, an amount in the range of substantially zero to no greater than 0.1% and this catalyst is returned to the main circulating catalyst body. The increments of catalyst being treated in said second regeneration zone are such that the total amount of inventory catalyst in the circulating stream has its carbon content reduced to less than 0.1% every 24 hour period. In carrying out the process of the present invention, the second regeneration step may be carried out batchwise in which case it is possible to reduce the carbon content of the catalyst in this regeneration step to substantially zero percent carbon, or alternatively it may be carried out as a continuous process in which the laws of mixing keep the carbon content of the catalyst from being reduced to zero but allow it to be reduced to an amount less than 0.1% which is substantially lower than the old carbon (from 0.3 to 1 weight percent) which remains on the regenerated catalyst withdrawn from the main regenerator.

The present invention will be described in conjunction with the drawing in which the figure is in the form of a diagrammatic flow sheet illustrating a modification of the present invention.

Turning now specifically to the drawing, a reactor vessel A and a regenerator vessel B are connected through catalyst transfer line C for conducting the spent catalyst from reactor A into regenerator B and transfer line D for transferring regenerated catalyst from the main regenerator B to reactor A. A second smaller regenerator E is arranged to take a small amount of regenerated catalyst from line D and reduce its carbon content from an amount within the range of 0.3%–1% to an amount less than 0.1%.

The apparatus is shown diagrammatically and in order to simplify the drawing, detailed portions such as valves, blowers, and the like have been omitted from the drawing. In reactor A a dense bed is indicated at 11 with its upper surface at 12 and its lower surface maintained by a grid 13. The reaction products and entrained catalyst pass out of reactor A through cyclone separator 14 where the entrained catalyst is separated and returned to the bed 11 by line 15. The reaction products substantially free from catalyst are discharged from the reactor A by line 16. In regenerator B a dense bed 17 is maintained with the upper surface of the bed indicated as 18. Dense bed 17 is supported on a grid indicated as 19. A mixture of flue gases and entrained catalyst resulting from the regeneration process in regenerator B pass into cyclone separator 20 where the entrained catalyst is separated and returned to dense bed 17 by line 21. Flue gases from which entrained catalyst has been separated are discharged from the regenerator B by line 22. Circulation of spent catalyst from reactor A to regenerator B and regenerated catalyst from regenerator B to reactor A is accomplished as follows: Spent catalyst is removed from reactor A by transfer line C into which is introduced a compressed oxygen-containing gas such as air by line 23. The oxygen-containing gas introduced by line 23 serves to fluidize the catalyst flowing upwardly in line C into regenerator B, and also to provide oxygen required for combustion of carbon from the catalyst which has accumulated thereon during its prior cycle through the reactor vessel A. After a desired amount of carbon has been burned off of the catalyst in regenerator B, the regenerated catalyst is returned to reactor A through line D by introducing by line 24 a fluidizing medium which serves to transport the catalyst upwardly in transfer line D to reactor A. This fluidizing medium may be the feed stock to the conversion process.

A small portion of the regenerated catalyst from regenerator B is withdrawn from transfer line D through line 25 into second regenerator E where its carbon content is reduced substantially below the carbon content of the equilibrium regenerated catalyst in transfer line D. An oxygen-containing gas such as air is introduced into second regenerator E by inlet line 26. In order to insure the removal of the old carbon from the catalyst in second regenerator E, the flue gases leaving E ordinarily will contain an appreciable amount of oxygen such as a minimum in the neighborhood of 5 volume percent. These hot, oxygen-containing gases may pass by line 27 into the main regenerator B to aid in the combustion therein. If desired, the burning reaction in the second regenerator E may be conducted in a batchwise fashion, in which case, the catalyst withdrawn from second regenerator E will have substantially zero carbon content. Alternatively, the carbon burning procedure may be conducted in second regenerator E in a continuous manner, in which case it is theoretically impossible to reduce the carbon content of the catalyst to zero, and in such a procedure, the carbon content is generally reduced to an amount below about 0.1%. Catalyst from second regenerator E is passed by means of line 28 into regenerated catalyst transfer line D. The catalyst is maintained in a fluidized state in line 28 by introduction of a gaseous fluid by inlet line 29.

As the catalyst particles pass in a cycle through reactor A they have carbon deposited on them and as they pass through the subsequent cycle in regenerator B substantially all of the carbon accumulated on the catalyst in its immediate prior cycle through the reactor is burned from the catalyst but a small amount of carbon usually in the neighborhood of 0.4% remains on the catalyst. Small increments of this regenerated catalyst are then treated in second reactor E to reduce the content of the old carbon, that is the carbon which is not burned off from the catalyst as it passes through the main regenerator B, to an amount less than 0.1%. The increments of catalyst treated in the second regeneration zone are at least sufficient so that the total amount of catalyst circulating through the system which, for convenience, may be designated inventory catalyst, has its carbon content reduced to less than 0.1% every 24 hour period.

Because of the laws of mixing, which are applicable to the system as a whole, it is necessary that the actual increments of catalyst treated in the second regeneration zone be substantially greater than the total amount of inventory catalyst. In general, it is necessary to treat from two to three times as much catalyst per 24 hour period as the total amount of inventory catalyst to insure that substantially all of the inventory catalyst (say approximately 95% of the inventory catalyst) actually is treated in the secondary regeneration zone in every 24 hour period. It will be understood that the catalyst passing through the second regenerator may be such an amount that the total inventory catalyst passes through the regenerator more often than once every 24 hour period. For example, the age of the old carbon on the catalyst may be maintained within the range of 1/10 to 1 day as desired. However, in commercial operations the regenerative capacity of the unit is the item which most often restricts the capacity of the unit and for economic reasons it will generally be found most desirable to conduct the operations in accordance with the present invention so that the age of the old carbon on the catalyst is one day.

By way of examples of the specific amounts of catalyst which may be involved in the various procedures, the following Table I is set out in which column 1 refers to a cracking unit in which the catalyst in the reactor is in a disperse phase and the catalyst in the regenerator is in a dense phase, this unit being commonly designated as having a transfer line reactor and a dense phase regenerator. Column 2 refers to a unit in which the catalyst in the reactor is in the form of a dense phase and the catalyst in the regenerator is in the form of a dense phase, this unit being commonly designated as having a dense bed reactor and a dense bed regenerator.

*Table I*

| Column | 1 | 2 |
|---|---|---|
| Catalyst circulation rate _____tons/min__ | 35 | 50 |
| Total catalyst inventory_____tons__ | 280 | 380 |

Catalyst in the systems reported in columns 1 and 2 in Table I was distributed as shown in columns 1 and 2, respectively, in the following Table II:

*Table II*

| Column | 1 | 2 |
|---|---|---|
| Distribution of catalyst in system: | Tons | Tons |
| Reactor hold-up_____ | 10 | 30 |
| Regenerator hold-up above grid_____ | 65 | 200 |
| Remainder in standpipes, stripper connecting lines, vessels and auxiliaries_____ | 205 | 150 |

In the unit referred to in column 1 of Tables I and II above, the catalyst must pass to the second regenerator at the rate of 0.195 ton per minute in order for the total inventory to pass through the second reactor at least once each 24 hours. As heretofore explained for a continuous operation, this rate must be increased in the order of 2 to 3 fold in order to insure that at least 95% of the catalyst actually passes through the second regenerator each 24 hours period. In the system referred to in column 2 it is necessary that approximately 0.264 ton per minute of catalyst pass through the second regenerator in order that all of the inventory catalyst pass through the unit for each 24 hour period and here again it is necessary that this amount be increased in the neighborhood of 2 to 3 fold in order to insure that at least 95% of the catalyst in the inventory passes through the second regenerator and so maintains the average life of the old carbon in the catalyst to no more than 24 hours.

As heretofore explained, in order to reduce the carbon in the second regenerator to the low value required, the flue gases leaving the second regenerator unit must contain an appreciable amount of oxygen such as in the neighborhood of 5% oxygen and in order to conserve heat energy and to reduce combustion air requirements, it is desirable to pass these hot oxygen-containing gases into the main regenerator where the residual oxygen may be used to burn additional carbon.

While preferred embodiments of the present invention have been described and illustrated in the present application, it will be understood that these embodiments are for purposes of inllustration only and are not intended by way of limitation.

I claim:

1. In a process for converting petroleum in which a circulating stream of fluidized solid catalyst is employed in a system with a body of fluidized catalyst maintained in a reaction zone wherein carbon is deposited on the catalyst and a body of spent catalyst maintained in a regeneration zone where carbon deposited on the catalyst during its immediate prior cycle through the reactor is burned from said catalyst to provide a regenerated catalyst having about an 0.3 to 1% carbon content and the regenerated catalyst is returned to the reaction zone, the step of removing small increments of catalyst from said circulating stream to a second regeneration zone and there burning it to reduce the carbon content of the catalyst to less than 0.1% and returning said catalyst with less than 0.1% carbon content to said circulating catalyst cycle, the increments of catalyst treated in said second regeneration zone for each 24 hour period being at least equal to the total amount of catalyst inventory in said system.

2. A process in accordance with claim 1 in which the flue gases removed from said second regeneration zone are passed to said first regeneration zone to aid in the combustion in said zone.

3. A process in accordance with claim 1 in which batches of catalyst are treated in the second regeneration zone and the carbon content of each batch is reduced to approximately zero.

4. A process in accordance with claim 1 in which a continuous stream of catalyst is removed from said circulating stream to said second regeneration zone, catalyst continuously moves through said second regeneration zone and a stream of catalyst is continuously passed from the second regeneration zone to said circulating stream.

5. In a process for cracking petroleum in which a circulating stream of fluidized solid silica alumina catalyst is employed in a system with a body of fluidized catalyst maintained in a reaction zone wherein carbon is deposited on the catalyst and a body of spent catalyst maintained in a regeneration zone where carbon deposited on the catalyst during its immediate prior cycle through the reactor is burned from said catalyst to provide a regenerated catalyst having about an 0.3 to 1 % carbon content and the regenerated catalyst is returned to the reaction zone, the step of removing small increments of catalyst from said circulating stream to a second regeneration zone and there burning it to reduce the carbon content of the catalyst to less than 0.1% and returning said catalyst with less than 0.1% carbon content to said circulating catalyst cycle, the increments of catalyst treated in said second regeneration zone for each 24 hour period being at least equal to the total amount of catalyst inventory in said system.

6. A process in accordance with claim 5 in which the flue gases removed from said second regeneration zone are passed to said first regeneration zone to aid in the combustion in said zone.

7. A process in accordance with claim 5 in which batches of catalyst are treated in the second regeneration zone and the carbon content of each batch is reduced to approximately zero.

8. A process in accordance with claim 5 in which a continuous stream of catalyst is removed from said circulating stream to said second regeneration zone, catalyst continuously moves through said second regeneration zone and a stream of catalyst is continuously passed from the second regeneration zone to said circulating stream.

9. In a process for cracking petroleum in which a circulating stream of fluidized solid silica alumina catalyst is employed in a system with a body of fluidized catalyst maintained in a reaction zone wherein carbon is deposited on the catalyst and a body of spent catalyst is maintained in a first regeneration zone where carbon deposited on the catalyst during its immediate prior cycle through the reactor is burned from said catalyst to provide a regenerated catalyst having an 0.3 to 1% carbon content and the regenerated catalyst is returned to the reaction zone, the improvement which comprises the steps of continuously removing catalyst from said circulating stream to a second regenerator at the rate of about 0.07 to 0.2% by weight of catalyst per minute and there burning said removed portion to reduce the carbon content thereof to less than about 0.1% and then returning said burned portion to the said circulating catalyst cycle.

10. A process as in claim 9 wherein the fluidized catalyst is maintained in disperse phase in said reaction zone and in dense phase in said first regeneration zone.

11. A process as in claim 9 wherein the fluidized catalyst is maintained in dense phase in said reaction zone and also in said first regeneration zone.

References Cited in the file of this patent

UNITED STATES PATENTS

| | | |
|---|---|---|
| 2,367,281 | Johnson | Jan. 16, 1945 |
| 2,394,710 | McAfee | Feb. 12, 1946 |
| 2,417,275 | Thompson | Mar. 11, 1947 |
| 2,425,849 | Voorhees | Aug. 19, 1947 |
| 2,449,622 | Roetheli | Sept. 21, 1948 |